United States Patent
Fan

(10) Patent No.: US 7,301,564 B2
(45) Date of Patent: Nov. 27, 2007

(54) SYSTEMS AND METHODS FOR PROCESSING A DIGITAL CAPTURED IMAGE

(75) Inventor: Jian Fan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1127 days.

(21) Appl. No.: 10/197,072

(22) Filed: Jul. 17, 2002

(65) Prior Publication Data

US 2004/0012679 A1    Jan. 22, 2004

(51) Int. Cl.
*H04N 5/235* (2006.01)
(52) U.S. Cl. .................................. 348/222.1
(58) Field of Classification Search ............. 348/222.1, 348/239, 241; 382/289, 293, 295, 301
See application file for complete search history.

(56) References Cited

U.S. PATENT DOCUMENTS

| 5,343,254 | A  | * | 8/1994  | Wada et al. ................ 348/627 |
| 5,808,623 | A  | * | 9/1998  | Hamburg .................... 345/619 |
| 6,801,653 | B1 | * | 10/2004 | Wu et al. .................... 382/154 |
| 6,804,387 | B1 | * | 10/2004 | Sakaue et al. ............... 382/141 |
| 6,806,903 | B1 | * | 10/2004 | Okisu et al. ................ 348/254 |
| 7,116,823 | B2 | * | 10/2006 | Clark et al. ................. 382/199 |
| 2002/0061131 | A1 | * | 5/2002 | Sawhney et al. ........... 382/154 |
| 2003/0026482 | A1 | * | 2/2003 | Dance ......................... 382/199 |
| 2003/0043303 | A1 | * | 3/2003 | Karuta et al. ............... 348/744 |

OTHER PUBLICATIONS

MClean, G.F. "geometric Correction of digital Art," Graphical Models and Image Processing, vol. 58, No. 2. (Mar. 1996) pp. 142-154.*
McLean, G.F. "Geometric Correction of Digitized Art," Graphical Models and Image Processing, vol. 58, No. 2. (Mar. 1996) pp. 142-154.

* cited by examiner

*Primary Examiner*—Lin Ye
*Assistant Examiner*—James M. Hannett

(57) ABSTRACT

In one embodiment, the present invention is directed to a method for processing a digitally captured image that comprises an imaged document. The method comprises: detecting graphical information related to spatial discontinuities of the digitally captured image; detecting lines from the detected graphical information; computing effective area parameters for quadrilaterals associated with ones of the detected lines, wherein each effective area parameter for a respective quadrilateral equals an area of the respective quadrilateral modified by at least a corner matching score that is indicative of a number of connected edge pixels in corners of the respective quadrilateral; and selecting a quadrilateral of the quadrilaterals that possesses a largest effective area parameter.

21 Claims, 8 Drawing Sheets

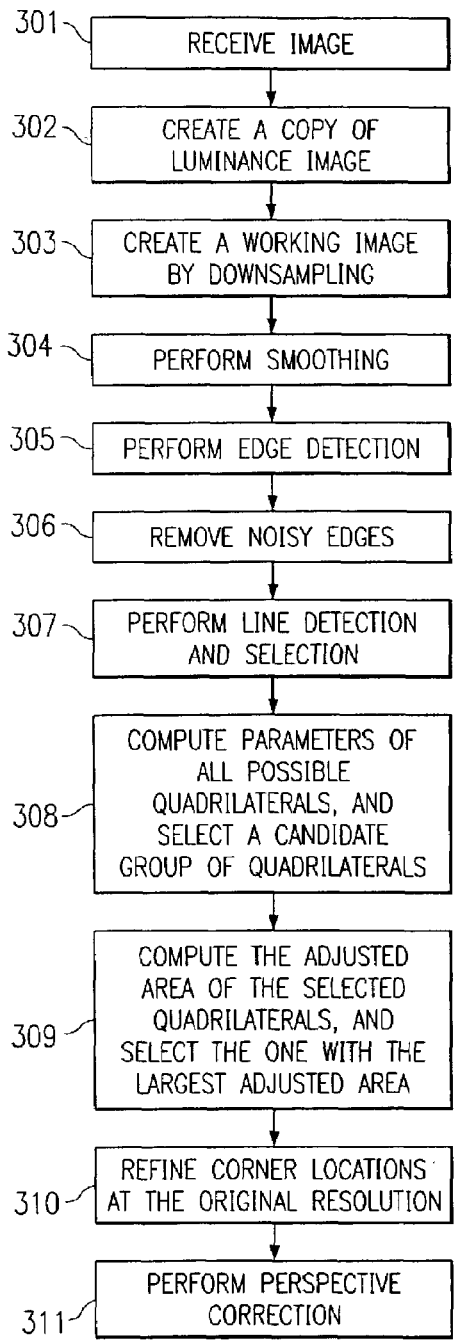
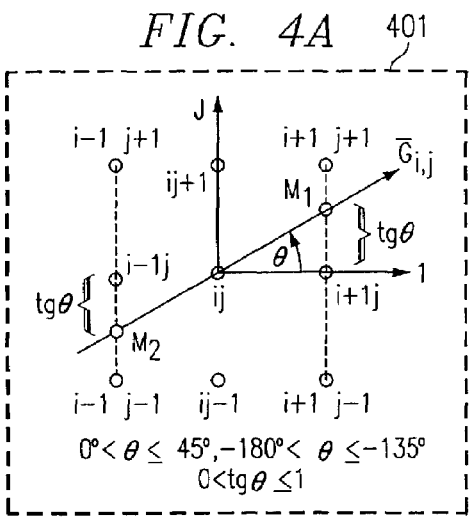
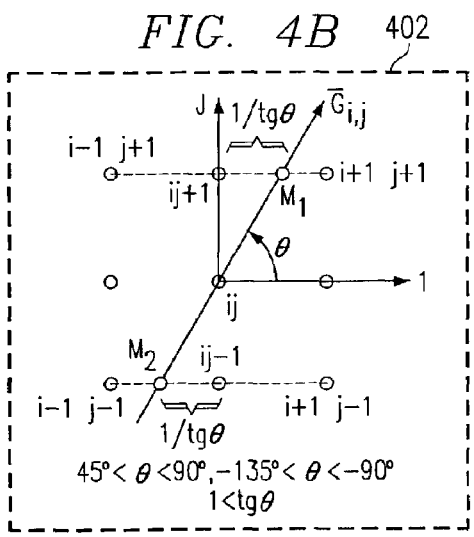

FIG. 3

301 RECEIVE IMAGE
302 CREATE A COPY OF LUMINANCE IMAGE
303 CREATE A WORKING IMAGE BY DOWNSAMPLING
304 PERFORM SMOOTHING
305 PERFORM EDGE DETECTION
306 REMOVE NOISY EDGES
307 PERFORM LINE DETECTION AND SELECTION
308 COMPUTE PARAMETERS OF ALL POSSIBLE QUADRILATERALS, AND SELECT A CANDIDATE GROUP OF QUADRILATERALS
309 COMPUTE THE ADJUSTED AREA OF THE SELECTED QUADRILATERALS, AND SELECT THE ONE WITH THE LARGEST ADJUSTED AREA
310 REFINE CORNER LOCATIONS AT THE ORIGINAL RESOLUTION
311 PERFORM PERSPECTIVE CORRECTION

FIG. 4A 401

$0° < \theta \le 45°, -180° < \theta \le -135°$
$0 < tg\theta \le 1$

FIG. 4B 402

$45° < \theta < 90°, -135° < \theta < -90°$
$1 < tg\theta$

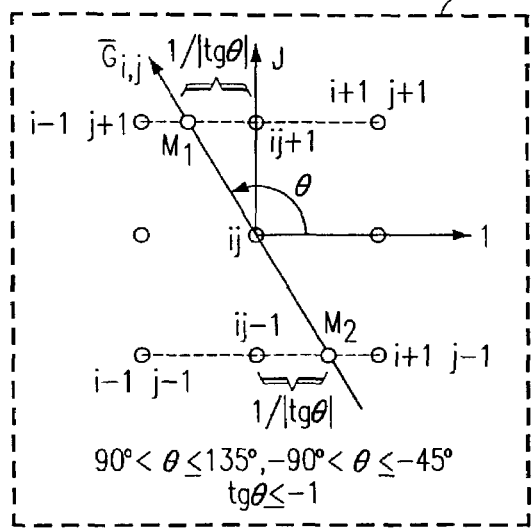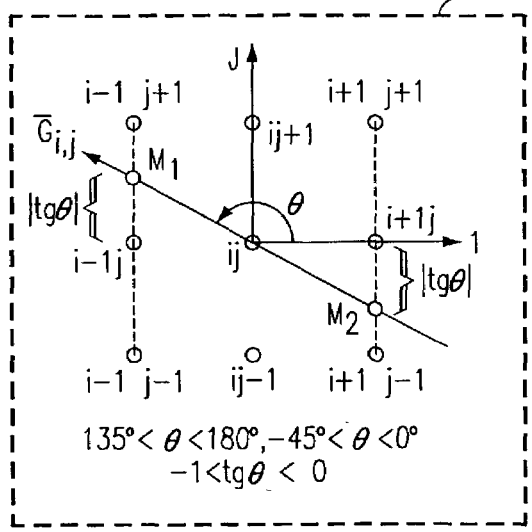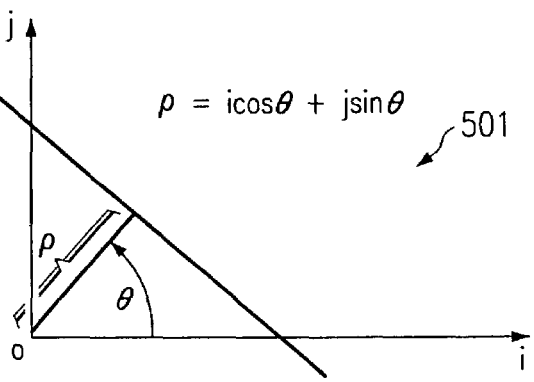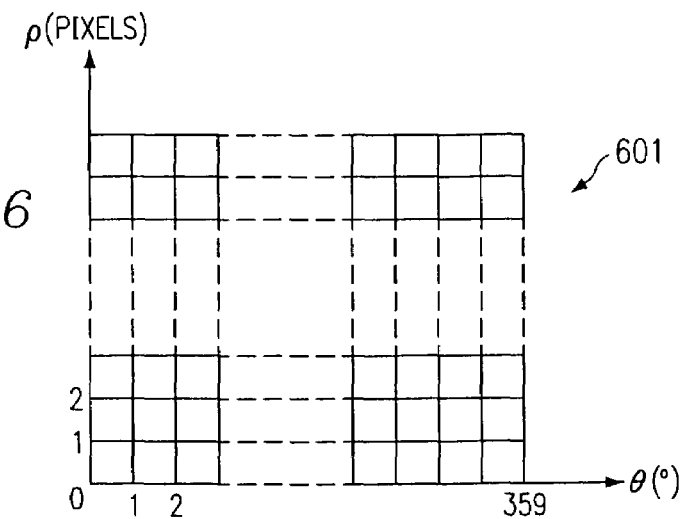

Each element of the array x[0:L] holds two numbers: p (projected pixel length) and d (distance to the edge pixel). The size of the array will be determined below.

If $|\cos\theta| < |\sin\theta|$
    L = height (of the edge map);
    Initialize all the elements of the array x with d=−1, p=0.
    lastj=−5;
    For i=0 to height−1
        $j = [(p - i \cdot \cos\theta)/\sin\theta]$;
        If $j \geq 0$ and $j <$ width (of the edge map)
            If there is an edge (i,k) within the range [i;j−D,j+D] satisfying the conditions: $|k-lastj| \leq 1$ and $|\cos(\theta_{i,k}-\theta)| > T_L$
                x(i).d = $(j-k)^2$;
                x(i).p = $|\cos(\theta_{i,k}-\theta)|$;
                lastj = k;
            Else if there is an edge (i,k) within the range [i;j−D,j+D] satisfying the conditions $|\cos(\theta_{i,k}-\theta)| > T_L$ and (lastj<0 or $|k-lastj| \leq 1$), and k is the index of the one having the shortest distance to j;
                x(i).d = $(j-k)^2$;
                x(i).p = $|\cos(\theta_{i,k}-\theta)|$;
                lastj = k;
            Endif
        Endif
    Endfor
Else
    L = width (of the edge map);
    Initialize all the elements of the array x with d=−1, p=0.
    lasti=−5;
    For j=0 to width−1
        $i = [(p - j \cdot \sin\theta)/\cos\theta]$;
        If $i \geq 0$ and $i <$ height (of the edge map)
            If there is an edge (k,j) within the range [i−D,i+D;j] satisfying the conditions: $|k-lasti| \leq 1$ and $|\cos(\theta_{i,k}-\theta)| > T_L$
                x(j).d = $(i-k)^2$;
                x(j).p = $|\cos(\theta_{i,k}-\theta)|$;
                lasti = k;
            Else if there is an edge (k,j) within the range [i−D, i+D;j] satisfying the conditions $|\cos(\theta_{i,k}-\theta)| > T_L$ and and (lasti<0 or $|k-lasti| \leq 1$), and k is the index of the one having the shortest distance to i;
                x(j).d = $(i-k)^2$;
                x(j).p = $|\cos(\theta_{i,k}-\theta)|$;
                lasti = k;
            Endif
        Endif
Endif   Endfor Do
    Find the line $(\theta_n, \rho_n)$ with the largest value of $H_{\theta,\rho}$      801
    If this is the first line
        Set a minimum value $H_{min}$ accordingly, for example, $H_{min} = H_{\theta_n,\rho_n}/7$.
    Endif
    If $H_{\theta_n,\rho_n}$ is larger than $H_{min}$
        Add this line $(\theta_n, \rho_n)$ into the selected lines.
        Reset $H_{\theta_n,\rho_n} = 0$.
    Else
        Stop and exit the loop
    Endif For $\rho = \max(0, \rho_n - \Delta\rho)$ to $\min(\rho_{max}, \rho_n + \Delta\rho)$ (e.g., $\Delta\rho=10$)
        If $\rho < 10$
            M=1;
        Else
            M=0;
        Endif
        For k=0 to M
            For $\theta = (\theta_n + k*180 - \Delta\theta)$ to $(\theta_n + k*180 + \Delta\theta)$ (e.g., $\Delta\theta=5$)
                If $H_{\theta,\rho} == 0$
                    Skip;
                Endif;

If $\theta \geq 0$ and $\theta < 360$
                    $\alpha = \theta$;
                Else if $\theta < 0$
                    $\alpha = \theta + 360$;
                Else
                    $\alpha = \theta - 360$;
                Endif;

If $(\alpha \neq \theta_n$ or $\rho \neq \rho_n)$
                    If $(|\sin(\alpha - \theta_n)| < 0.01)$
                        If $(|\rho - \rho_n| < 5)$
                            Set $H_{\alpha,\rho}$ to zero;
                    Else
                        Calculate the crossing point of line $(\rho,\alpha)$ and line $(\rho_n, \theta_n)$; If the crossing point is within the range $[-0.5*width, 1.5*width; -0.5*height, 1.5*height]$ and $h_{\alpha,\rho} < H_{\theta_n,\rho_n}$
                            Set $H_{\alpha,\rho}$ to zero.
                    Endif
                Endif
            Endfor
        Endfor
    Endfor
Until N lines found or gone through all $(\theta, \rho)$ space.

Initialize all the elements of the array x[ ] with d=−1, p=0.

If $|\cos\theta| < |\sin\theta|$
    lastj=−5;
    For i=$i_0$ to $i_1$ (and m=0 to $|i_0-i_1|-1$)
        j=$[(p-i\cdot\cos\theta)/\sin\theta]$;
    If j ≥ 0 and j < width (of the edge map)
        If there is an edge (i,k) within the range [i;j−D,j+D] satisfying the
        conditions: $|k-\text{lastj}| \le 1$ and $|\cos(\theta_{i,k}-\theta)| > T_{L1}$
            x(m).d = $(j-k)^2$;
            x(m).p = $|\cos(\theta_{i,k}-\theta)|$;
            lastj = k;
        Else if there is an edge (i,k) within the range [i;j−D,j+D] satisfying
        the condition$|\cos(\theta_{i,k}-\theta)| > T_{L2}$ and (lastj<0 or $|k-\text{lastj}| \le 1$), and
        k is the index of the one having the shortest distance to j;
            x(m).d = $(j-k)^2$;
            x(m).p = $|\cos(\theta_{i,k}-\theta)|$;
            lastj = k;
        Endif
    Endif
    Endfor
Else
    lasti=−5;
    For j=$j_0$ to $j_1$ (and m=0 to $|j_0-j_1|-1$)
        i=$[(p-j\cdot\sin\theta)/\cos\theta]$;
    If i ≥ 0 and i < height
        If there is an edge (k,j) within the range [i−D,i+D;j] satisfying the
        conditions: $|k-\text{lasti}| \le 1$ and $|\cos(\theta_{i,k}-\theta)| > T_{L1}$
            x(m).d = $(i-k)^2$;
            x(m).p = $|\cos(\theta_{i,k}-\theta)|$;
            lasti = k;
        Else if there is an edge (k,j) within the range [i−D,i+D;j]satisfying
        the condition$|\cos(\theta_{i,k}-\theta)| > T_{L2}$ and (lasti<0 or $|k-\text{lasti}| \le 1$), and
        k is the index of the one having the shortest distance to i;
            x(m).d = $(i-k)^2$;
            x(m).p = $|\cos(\theta_{i,k}-\theta)|$;
            lasti = k;
        Endif
    Endif
    Endfor
Endif

FIG. 13

If $|\cos\theta_k| < |\sin\theta_k|$

We fit the locations $\{(i_n, j_n)|_{0 \leq n < N}\}$ to the line $y = k \cdot x + b$ by the following formula:

$b = (SIJ \cdot SI - SJ \cdot SII)/(SI^2 - N \cdot SII);$
  $k = (SI \cdot SJ - N \cdot SIJ)/(SI^2 - N \cdot SII);$
  WHERE $SI = \sum_n i_n;\ SII = \sum_n i_n^2;\ SJ = \sum_n j_n;\ SIJ = \sum_n i_n j_n$ Else We fit the locations $\{(i_n, j_n)|_{0 \leq n < N}\}$ to the line $x = k \cdot y + b$ by the following formula:

$b = (SIJ \cdot SJ - SI \cdot SJJ)/(SJ^2 - N \cdot SJJ)$
  $k = (SI \cdot SJ - N \cdot SIJ)/(SJ^2 - N \cdot SJJ)$
  WHERE $SJ = \sum_n j_n;\ SJJ = \sum_n j_n^2;\ SI = \sum_n i_n;\ SIJ = \sum_n i_n j_n$ Endif.

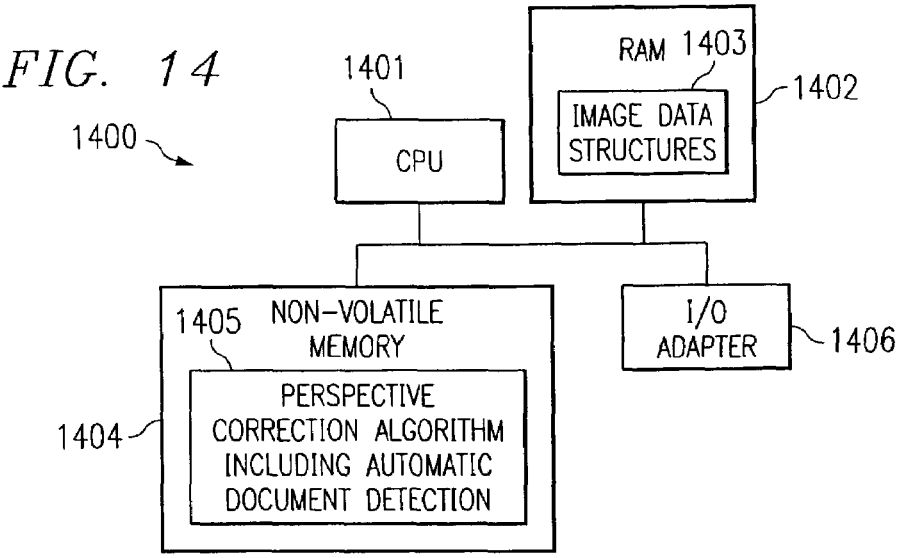

FIG. 14

SYSTEMS AND METHODS FOR PROCESSING A DIGITAL CAPTURED IMAGE

FIELD OF THE INVENTION

The present invention is, in general, related to systems and methods for processing a digitally captured image and, more particularly, for automatically detecting a perspective distorted document in a digitally captured image.

BACKGROUND OF THE INVENTION

FIG. 1A depicts digital camera 100 capturing an image of document 101 according to the prior art. Light is reflected from document 101 and is received by optical subsystem 102. Optical subsystem 102 optically reduces the image of document 101 to focus the image on charge-coupled device (CCD) 103. CCD 103 is typically implemented as a two-dimensional array of photosensitive capacitive elements. When light is incident on the photosensitive elements of CCD 103, charge is trapped in a depletion region of the semiconductor material of the elements. The amount of charge associated with the photosensitive capacitive elements is related to the intensity of light incident on the respective elements received over a sampling period. Accordingly, the image is captured by determining the intensity of incident light at the respective photosensitive capacitive elements via sampling the elements.

The analog information produced by the photosensitive capacitive elements is converted to digital information by analog-to-digital (A/D) conversion unit 104. A/D conversion unit 104 may convert the analog information received from CCD 103 in either a serial or parallel manner. The converted digital information may be stored in memory 105 (e.g., random access memory). The digital information is then processed by processor 106 according to control software stored in ROM 107 (e.g., PROM, EPROM, EEPROM, and/or the like). For example, the digital information may be compressed according to the Joint Photographic Experts Group (JPEG) standard. Additionally or alternatively, other circuitry (not shown) may be utilized to process the captured image such as an application specific integrated circuit (ASIC). User interface 108 (e.g., a touch screen, keys, and/or the like) may be utilized to edit the captured and processed image. The image may then be provided to output port 109. For example, the user may cause the image to be downloaded to a personal computer (not shown) via output port 109.

The quality of the captured image is dependent on the perspective or positioning of digital camera 100 with respect to document 101. Specifically, if digital camera 100 is off-angle, the captured image of document 101 may be skewed as shown in captured image 150 of FIG. 1B. Therefore, off-angle positioning may appreciably reduce the readability of the captured image of document 101.

Accordingly, the image data may be uploaded to a personal computer for processing by various known correction algorithms. The algorithms are employed to correct the distortion effects associated with off-angle images of documents. Typical known correction algorithms require a user to manually identify the corners of a region of a captured image. By measuring the spatial displacement of the identified corners from desired positions associated with a rectangular arrangement, an estimation of the amount of distortion is calculated. The correction algorithm then processes the imaged document to possess the desired perspective and size as necessary and may produce perspective enhanced image 200 of FIG. 2.

An automatic corner detection algorithm is described by G. F. McLean in Geometric Correction of Digitized Art, GRAPHICAL MODELS AND IMAGE PROCESSING, Vol. 58, No. 2, March, pp. 142-154 (1996). McLean's algorithm is intended to correct the perspective distortion associated with "archival images of two-dimensional art objects." Accordingly, the algorithm assumes that some degree of care was taken during the imaging or photography. Thus, the algorithm assumes that the resulting distorted quadrilaterals of the art form "a set of roughly 90° corners." Upon this assumption, the corners may be estimated by analyzing the intersection of lines that form approximately 90° interior angles. Although the McLean algorithm is clearly advantageous as compared to pure manual selection of corners, the assumptions of this algorithm are not always appropriate for digital images (e.g., those taken by casual users) which may exhibit appreciable perspective distortion.

BRIEF SUMMARY OF THE INVENTION

In one embodiment, the present invention is directed to a method for processing a digitally captured image that comprises an imaged document. The method comprises: detecting graphical information related to spatial discontinuities of the digitally captured image; detecting lines from the detected graphical information; computing effective area parameters for quadrilaterals associated with ones of the detected lines, wherein each effective area parameter for a respective quadrilateral equals an area of the respective quadrilateral modified by at least a corner matching score that is indicative of a number of connected edge pixels in corners of the respective quadrilateral; and selecting a quadrilateral of the quadrilaterals that possesses a largest effective area parameter.

BRIEF DESCRIPTION OF THE DRAWINGS

FIG. 3 depicts a flowchart of processing steps related to perspective correction including automatic imaged document detection according to embodiments of the present invention.

FIGS. 4A-4D depict gradient representations according to embodiments of the present invention.

FIG. 5 depicts a graphical representation of a line according to Hough parameterization as used by embodiments of the present invention.

FIG. 6 depicts quantized Hough parameter space as used by embodiments of the present invention.

FIG. 7 depicts pseudo-code that calculates an effective line parameters for graphic information according to embodiments of the present invention.

FIG. 8 depicts pseudo-code to select a plurality of lines for further analysis according to embodiments of the present invention.

FIG. 12 depicts pseudo-code that analyzes graphical information associated with an edge of a selected quadrilateral according to embodiments of the present invention.

FIG. 13 depicts pseudo-code that performs minimum mean square error (MMSE) line-fitting procedure with edge data according to embodiments of the present invention.

FIG. 14 depicts a block diagram of a system that may be utilized to implement embodiments of the present invention.

DETAILED DESCRIPTION OF THE INVENTION

Figure 2:
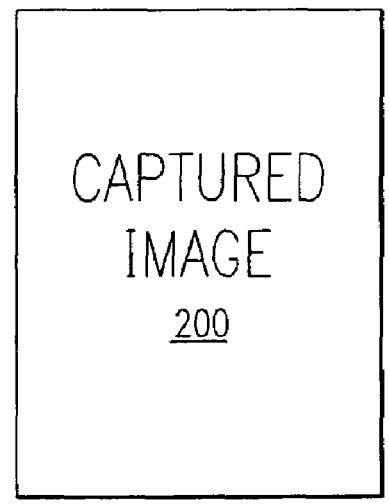
FIG. 2 depicts a perspective corrected imaged document according to the prior art.

Embodiments of the present invention are operable to process a digitally captured image that comprises a perspective distorted document. Embodiments of the present invention are operable to automatically detect the imaged document from the digitally captured image without requiring interaction from a user. After detection, embodiments of the present invention are operable to correct the perspective distortion of the image document and may performing scaling as desired. For example, embodiments of the present invention may process digitally captured image 150 of FIG. 2B to produce perspective enhanced image 200 as shown in FIG. 2 with requiring interaction from a user.

FIG. 3 depicts flowchart 300 that illustrates perspective adjustment of an imaged document including automatic detection of the imaged document from a digitally captured image according to embodiments of the present invention. Flowchart 300 may be implemented as programmable logic such as software instructions or code stored on any suitable medium such as a magnetic medium, optical medium, firmware medium, and/or the like. Additionally, flowchart 300 depicts various processing steps at a relatively high level. Accordingly, various steps will be subsequently discussed in greater detail.

In step 301 of flowchart 300, image data of a captured document is received. The image data may be encoded utilizing any suitable graphical encoding format including but not limited to Tag Image File Format (TIFF), Joint Photographic Experts Group (JPEG) format, Graphics Interchange Format (GIF), Portable Network Graphics (PNG), bit-mapped (BMP) format, and/or the like.

In step 302, if the image data is in a color format, the color image is transformed into a luminance image (e.g., grayscale values). For example, if the original image data is in RGB format (where R, G, and B respectively represent the intensities of the red, green, and blue chromatic components), the image data may be transformed as follows:

$$Y = \text{int}(0.299*R + 0.587**G + 0.114*B + 0.5),$$

where Y is the luminance value according to the YCrCb encoding scheme. It shall be appreciated that the present invention is not limited to any particular color coordinate system and other transforms may be utilized according to embodiments of the present invention.

In step 303, a working copy of the image may be created by down-sampling the image. The down-sampling reduces the complexity and, hence, processing time associated with the process flow. Down-sampling may occur utilizing any number of techniques. For example, the original luminance image may possess X×Y pixels which are divided into groups or blocks of pixels that are N×N pixels wide. In embodiments of the present invention, N is selected to equal seven (7), although other values may be utilized. The luminance of each block may be averaged. The average value for each block may be used as or mapped to the luminance for a single down-sampled pixel of the work copy. In this case, the work copy possesses (X/N)×(Y/N) down-sampled pixels possessing average values related to the respective blocks of the luminance map.

In step 304, the working copy is smoothed utilizing a low-pass filter. The following Gaussian filter may be used to smooth the working copy:

$$f_{i,j} = k e^{-a^2[(i-c)^2 + (j-c)^2]/c},$$

where k is a normalizing factor such that $$\sum_{i,j} f_{i,j} = 1.0$$

and c is the center of the filter. In embodiments of the present invention the size of the filter is selected to equal 5×5 pixels and α is selected to equal 1.7, although other values may be utilized.

In step 305, edge detection is performed upon the down-sampled and smoothed pixels. Edge detection generally refers to the processing of a graphical image to detecting or identifying spatial discontinuities of an image. Edge detection may include various steps to enhance graphical data that is related to such discontinuities and to suppress graphical data that is not related to such discontinuities before performing the detection process. Edge detection may occur by utilizing the Canny edge detection algorithm which is described in "A computational approach to edge detection," *IEEE Transactions on Pattern Analysis and Machine Intelligence*, Vol. PAMI-8, No. 6, November 1986, which is incorporated herein by reference. Other edge detection algorithms may also be utilized. Edge pixels or edge points may refer the pixels that retain non-zero values after the edge detection processing occurs.

In step 306, noisy edges are removed. For each edge pixel detected by the edge detection algorithm, neighboring edge pixels are counted within a square window (e.g., five by five (5×5)). For example, an edge pixel located at (i, j) would have neighboring edges pixel within the window having corners (i−w,j−w), (i+w, j−w), (i+w, j−w), and (i+w, j+w) where w is the size of the window. If the number of edge pixels within the square window is less than $C_L$ or larger than $C_H$, the respective pixel is removed. In embodiments of the present invention, $C_L$ is selected to equal three (3) and $C_H$ is selected to equal nine (9) for a five by five (5×5) window, although other values may be utilized. Additionally, after removing edge pixels via the window analysis, additional edge pixels may be removed by tracing edge 8-neighbor connectivity. Specifically, if an edge trace is less than a threshold (i.e, there are less number of pixels in the edge trace), all edge pixels in the trace are removed.

In step 307, line detection and selection are performed. For example, the Hough transform (see, for example, *Digital Image Processing*, Rafael C. Gonzalez and Paul Wintz, (1987 Second Edition), which is incorporated herein by reference) may be utilized to detect edges that approximate straight lines. Each line is assigned a metric that is referred to as the Effective Length (EL). Utilizing the EL metric, a predetermined number of detected lines are selected as candidates for page edges. In embodiments of the present invention, thirty-five (35) lines are selected, although other numbers of lines may be selected.

In step 308, the parameters of all possible quadrilaterals (for sided polygons) are computed and, based on the computed parameters, a candidate group of quadrilaterals is selected.

In step 309, the effective area of each quadrilateral of the candidate group is selected and the quadrilateral associated with the largest effective area metric is selected. The largest effective area metric utilizes the area of the respective quadrilaterals modified by a corner matching score and an edge matching score. In embodiments of the present invention, the corner matching score is calculated utilizing, in part, the number of connected edge pixels associated with corners of a respective quadrilateral. In embodiments of the present invention, the edge matching score is calculated utilizing, in part, the number of connected edge pixels of sides of the respective quadrilateral. By utilizing an effective area parameter calculated in this manner, embodiments of the present invention enable perspective correction of relatively highly skewed imaged documents (e.g., those taken by casual users). Thus, embodiments of the present invention are not limited to correcting perspective of quadrilaterals that form a set of roughly 90° corners. Moreover, an effective area parameter calculated in this manner enables performance of perspective correction to be relatively robust to noise in the digital image.

In step 310, the corner locations are refined using a minimum mean square error (MMSE) line-fitting procedure. Specifically, lines are selected from the detected edges that minimize the mean square error of the line to the detected edges. The lines that satisfy the MMSE condition are used to defined the corner locations.

In step 311, based upon the refined corner locations, perspective correction is performed. Suitable perspective correction algorithms may utilize a polygon mapping technique. Specifically, each pixel in the imaged document may be mapped to a polygon in the enhanced image, where the shape of the polygon is dependent upon the position of the pixel and the positions of the final corner locations.

Because the processing of flowchart 300 has been discussed at a relatively high-level for the convenience of the reader, it is now appropriate to discuss processing of certain steps of flowchart 300 in greater detail. As previously discussed with respect to step 305 of flowchart 300, edge detection may be performed by processing of the work copy of the luminance image to enhance spatial discontinuities in the work copy and to suppress graphical data that is not related to such discontinuities. According to embodiments of the present invention, to perform the processing, the following gradient calculations are performed:

$$G_{i,j}^I = (y_{i+1,j-1} + 2y_{i+1,j} + y_{i+1,j+1}) - (y_{i-1,j-1} + 2y_{i-1,j} + y_{i-1,j+1})$$

$$G_{i,j}^J = (y_{i+1,j+1} + 2y_{i,j+1} + y_{i-1,j+1}) - (y_{i+1,j-1} + 2y_{i,j-1} + y_{i-1,j-1})$$

$$M_{i,j} = \sqrt{G_{i,j}^I \cdot G_{i,j}^I + G_{i,j}^J \cdot G_{i,j}^J}$$

$$\theta = \arctan(G_{i,j}^J / G_{i,j}^I),$$

where $G_{i,j}^I$ is the orthogonal gradient component in the vertical direction at point (i,j), $G_{i,j}^J$ is the orthogonal gradient component in the horizontal direction at point (i,j), $M_{i,j}$ is the magnitude of the gradient at point (i,j), $\theta$ is the angle of the gradient (i,j), and $y_{i,j}$ is the luminance of the work copy at point i,j.

After performing the gradient calculations, the magnitude of the gradient at two point in the gradient direction may be linearly interpolated as described by the following pseudo-code:

If($G_{i,j}^J = 0$) then $M_1 = M_{i,j-1}$ and $M_2 = M_{i,j+1}$ and $\theta = \pi/2$
  Else If ($G_{i,j}^J = 0$) then $M_1 = M_{i-1,j}$ and $M_2 = M_{i+1,j}$ and $\theta = 0$
  Else
    $tg\theta = G_{i,j}^I/G_{i,j}^J$;
    If ($tg\theta \leq -1$) then $M_1 = (1 + 1/tg\theta)M_{i+1,j} - (1/tg\theta) \cdot M_{i+1,j-1}$ and $M_2 = (1 + 1/tg\theta)M_{i-1,j} - (1/tg\theta) \cdot M_{i-1,j+1}$;
    Else If ($-1 < tg\theta < 0$) then $M_1 = (1 + tg\theta)M_{i,j-1} - 1/tg\theta \cdot M_{i-1}$ and
    $M_2 = (1 + tg\theta)M_{i,j+1} - tg\theta \cdot M_{i-1,j+1}$;
    Else if ($0 < tg\theta \leq 1$) then $M_1 = (1 - tg\theta)M_{i,j+1} + tg\theta \cdot M_{i+1,j+1}$ and
    $M_2 = (1 - tg\theta)M_{i,j-1} + tg\theta \cdot M_{i-1,j-1}$;
    Else if ($tg\theta > 1$) then $M_1 = (1 - 1/tg\theta)M_{i+1,j} + (1/tg\theta) \cdot M_{i+1,j+1}$ and
    $M_2 = (1 - 1/tg\theta)M_{i-1,j} + (1/tg\theta) \cdot M_{i-1,j-1}$
    Endif
Endif FIGS. 4A-4D depict gradient representations 401-404 including tgθ according to various gradient directions for the convenience of the reader. Note that $\vec{G}_{i,j}$ as shown in gradient representations 404-404 is the gradient vector.

From the linear interpolation, the existence of an edge is preferably detected (see step 305 of flowchart 300) by the following logic (where $T_e$ is a threshold value and equals five (5) for embodiments of the present invention):

If $M_{i,j} > M_1$ and $M_{i,j} \geq M_2$ and $M_{i,j} > T_e$ then
  This is an edge point and the edge attributes are $M_{ij}$ and $\theta_{ij}$. Notice that $\theta_{ij}$ is the angle of the gradient and is perpendicular to the edge direction.
Else
  This is not an edge point and marked and the edge attributes are reset with values of 0 ($M_{ij}$ is set to zero and $\theta_{ij}$ is set to zero)
Endif In the preceding pseudo-code, it shall be appreciated that $M_1$ and $M_2$ are the respective gradient magnitudes at two points and $M_{ij}$ and $\theta_{ij}$ are the linearly interpolated gradient parameters graphically depicted in FIGS. 4A-4D.

As previously discussed, line detection (step 307) preferably occurs after edge detection (305) and removal of noisy edges (306). To implement step 307 of flowchart 300, a Hough transform may be utilized to perform line detection from the detected edges and to assign a metric call Effective Length. The Hough transform uses the mathematical representation of $\rho = i \sin + j \cos \theta$ as illustrated in mathematical representation 501 of FIG. 5. The Hough transform is relatively tolerant of gaps in feature boundaries and is relatively unaffected by image noise. In the image analysis context, the coordinates of the edge points are known due to the operations of previous steps. The known edge points serve as constraints to a parametric line equation. When analyzed in Hough parameter space, points that are colinear in the Cartesian image space become readily detectable as yield curves that intersect at common parameters in the Hough space. Accordingly, the Hough line detection algorithm operates by generating an accumulator array where peaks in the accumulator array correspond to straight lines in the image data.

Additionally, it shall be appreciated that this representation is consistent with the edge representation that uses the line's normal angle for the line's orientation. For embodiments of the present invention, the parameters ($\rho$, $\theta$) are quantized into discrete levels. The quantized parameter space may be represented by a two-dimensional integer array $H_{\rho,\theta}$ (the accumulator array) as depicted by quantized parameter space 601 of FIG. 6.

To perform line detection (step 307 of flowchart 300) according to embodiments of the present invention, all entries of the array $H_{\rho,\theta}$ are initialized to equal zero. For every edge pixel at location (i,j) that is marked by $M_{i,j}>0$, the following pseudo-code is performed to analyze the respective edge pixels:

```
For a = 0 to 359
    ρ = i · cos a + j · sin a;
    If ρ ≧ 0 and |cos(θ_{i,j} − a)| > T_L
        H_{a,ρ} = H_{a,ρ} + |cos(θ_{i,j} − a)|
    End if.
Endfor
End for.
```

In the preceding pseudo-code, $T_L$ is a parameter that sets the statistical criteria of the permissible deviation between an edge and line orientations. In embodiments of the present invention, $T_L$ is selected to equal 0.95, although other values may be utilized.

After building the accumulator array, a minimum line length ($L_{min}$) may be advantageously applied. In embodiments of the present invention, $L_{min}$ is selected to equal one twentieth (1/20) of the maximum side length of the edge map, although other values may be utilized. All entries of the array $H_{92,\theta}$ that possess a count less than $L_{min}$ are set to zero.

Each non-zero entry of the array $H_{\rho,\theta}$ represents a potential line for further analysis. The Effective Length (EL) of each candidate is calculated using the edge map. The Effective Length calculation begins by representing each potential line as the array x[ ] via the operations depicted in pseudo-code 701 of FIG. 7. In pseudo-code 701, the parameter D determines the search range for adjacent edge points. In embodiments of the present invention, D is selected to equal three (3), although other values may be utilized. According to pseudo-code 701, when calculating of the Effective Length (EL) utilizing the array x[ ] created, a segment of the array x[ ] defined the index range [$i_0, i_1$] is a consecutive edge segment if all the elements within the segment satisfy $x[i_0, i_1] > 0$. A segment of the array x defined by the index range [$i_0, i_1$] is a connected consecutive edge segment if any adjacent two consecutive edge segments within the range are no more than $D_s$ apart. In embodiments of the present invention, $D_s$ is selected to equal 30, although other values may be utilized.

The Effective Length (EL) of a candidate line may be computed from the array x[ ] as follows:

$$EL = D_{max} - \sqrt{\varepsilon} \text{ where } D_{max} = \sum_{k \in CCS} x[k] \cdot p$$

which equals the sum of the projected pixel length of the longest connected consecutive edge segment CCS within the array $$x[] \text{ and } \varepsilon = \sum_{k \in CCS} x[k] \cdot d$$

which equals the sum of distances corresponding to the longest consecutive edge segment. After determining the Effective Length (EL) for a potential line, the respective position in the array $H_{\rho,\theta}$ is replaced with the value EL.

After calculating the Effective Length (EL) for the respective candidates in the array $H_{\rho,\eta}$, a predetermined number of lines are selected from the array as candidate lines (step 307 of flowchart 300). The predetermined number of candidate lines may be selected according to pseudo-code 801 of FIG. 8. With respect to pseudo-code 801, the crossing point (i,j) of any two unparallel lines represented by ($\rho_0, \theta_0$), ($\rho_1, \theta_1$) can be computed by:

$$j = (\rho_1 \cos \theta_0 - \rho_0 \cos \theta_1)/\sin(\theta_1 - \theta_0)$$

$$i = (\rho_0 \sin \theta_1 - \rho_1 \sin \theta_0)/\sin(\theta_1 - \theta_0)$$

As previously noted, the possible quadrilaterals defined by the candidate lines of step 307 are analyzed in step 308 of FIG. 3. It shall be appreciated that four lines may possibly constitute a quadrilateral. For N lines, the number of possible candidates may be computed by:

$$C_N^4 = (N \cdot (N-1) \cdot (N-2) \cdot (N-3))/24$$

The following pseudo-code demonstrates an iterative computational process flow that may be utilized to evaluate each possible quadrilateral using the line representation of ($\rho_N, \theta_N, EL_N$):

```
For i=0 to (N−4)
    For j=(i+1) to (N−3)
        For k=(j+1) to (N−2)
            For m=(k+1) to (N−1)
                Compute parameters of the quadrilateral made
                up by lines i, j, k and m.
                If the area of the quadrilateral is larger
                than the value minArea
                    Add the quadrilateral into selection.
                    Assign the key = (area + EL of the four lines).
                Endif
            Endfor
        Endfor
    Endfor
Endfor
```

In the preceding pseudo-code, minArea is the minimum area required for a page quadrilateral (e.g., a quadrilateral that could correspond to an imaged document) which is selected to equal one sixteenth (1/16) of the area of the edge map according to embodiments of the invention.

Figure 9:
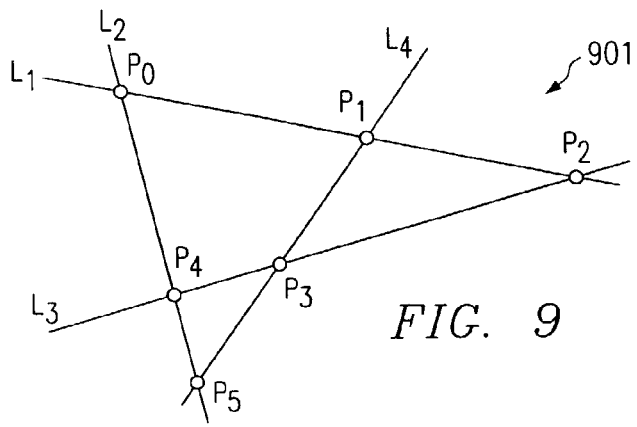
FIG. 9 depicts a graph of detected lines according to embodiments of the present invention.
Figure 10:
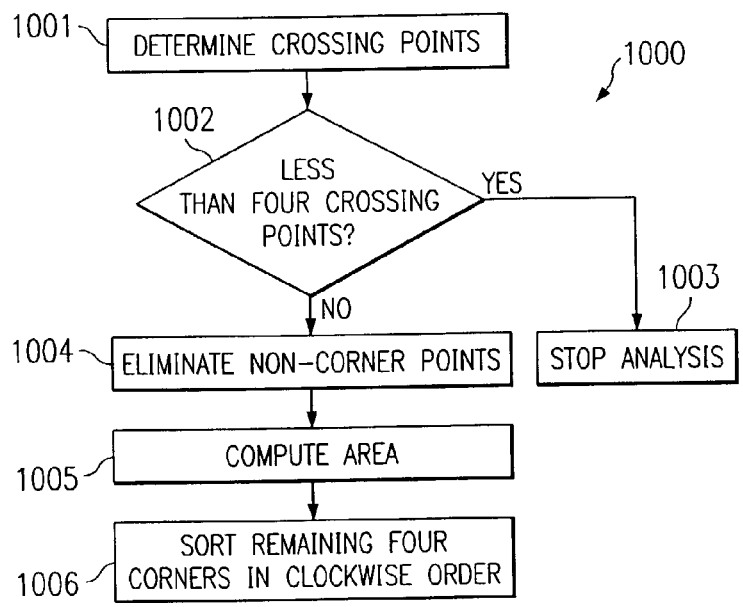
FIG. 10 depicts a flowchart that processes detected lines according to embodiments of the present invention.

Reference is now made to line graph 901 of FIG. 9 to visually illustrate the determination of the parameters (e.g., the corner locations and the area) of quadrilaterals according to embodiments of the present invention (see step 309 of flowchart 300). FIG. 10 depicts flowchart 1000 to descriptively illustrate determination of the parameters of quadrilaterals according to embodiments of the present invention. In step 1001, from the four lines identified by the preceding iterative pseudo-code (e.g., $L_1, L_2, L_3$, and $L_4$ of FIG. 9), the crossing points are determined. For four lines, there are a maximum of six (6) crossing points. If there are less than four crossing points (step 1001) located, the quadrilateral parameter determination stops (step 1002) and the area for the quadrilateral is assigned to negative one (−1) to indicate that the line combination does not define a quadrilateral. If there are four crossing points, points that are not corners of a quadrilateral are eliminated (step 1004). These points, for example ($P_5$), may be identified by the following two conditions: (1) the two other points ($P_4$ and $P_0$, and $P_3$ and $P_1$) in the two lines ($L_2$ and $L_4$) that intersect at $P_5$ are in the same direction relative to $P_5$; (2) the two closest points relative to $P_5$ at the two lines ($L_2$ and $L_4$) are in the same line ($L_3$). After elimination, the quadrilateral area defined by the remaining crossing points is computed (step 1005). The remaining four corners are sorted in clockwise order.

As previously discussed, from all of the possible quadrilaterals, M candidate quadrilaterals are selected for further analysis according to relative areas. In embodiments of the present invention, M is selected to equal thirty-five (35), although other values may be utilized. For each of the M candidate, an adjusted area computation is performed (see step 309 of FIG. 3). The Effective Area (EA) metric may be defined as follows:

$$EA = (1 + cs \cdot W_c + es \cdot W_e) \cdot area,$$

where Cs is a corner-matching score normalized to the range of [0.0,1.0], es is an edge-matching score that is also normalized, $W_c$ is a weight for corner-matching, and $W_e$ is a weight of edge matching.

Figure 11:
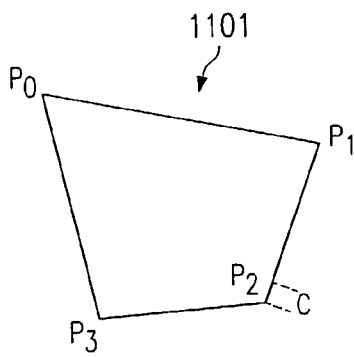
FIG. 11 depicts a selected quadrilateral according to embodiments of the present invention.

For illustrative purposes, reference is now made to quadrilateral 1101 of FIG. 11. Quadrilateral 1101 comprises corners ($P_0$, $P_1$, $P_2$, and $P_3$). A size of a corner (shown as C) may be specified by an integer C. The corner size C may be selected relative to a respective edge map. Computationally, C may be selected as follows:

$$C = \max(30, \max(width, height)/12),$$

where width and height are the width and height of the respective edge map.

For each edge n of a candidate quadrilateral specified by two corner points ($i_0, j_0$) and ($i_1, j_1$) of (line $\rho$, $\theta$), a working array x[0:L] is utilized according to the processing of pseudo-code 1201 of FIG. 12 to calculate respective area parameters. In pseudo-code 1201, each element of array x[0:L] holds two numbers: p (projected pixel length) and d (distance to the edge pixel). The size of the array may be set by $$L = 2 \cdot \sqrt{width^2 + height^2},$$

where width and height are the dimensions of the edge map. Also, the parameter D of pseudo-code 1201 limits search processing while $T_{L1}$ and $T_{L2}$ are threshold values. In embodiments of the present invention, D is selected to equal five (5), $T_{L1}$ is selected to equal 0.9, and $T_{L2}$ is selected to equal 0.98, although other values may be utilized.

From the array created by pseudo-code 1201, two values may be computed for each set of ends ($i_0, j_0$) and ($i_1, j_1$). The first value is the corner pixel ratio ($cpr_{n,m}$) which equals: (the number of $x(i).d \geq 0$ (connected edge pixels) entries within the corner segment) divided by the corner size C for the respective C as defined above. The second value is the corner matching score ($cs_{n,m}$) which equals: (the number of $x(i).d \geq 0$ within the corner plus the longest consecutive segment within the corner minus the square root of the sum of distances corresponding to the longest consecutive segment)/(2C). Additionally, it shall be observed that the index n may take the values of 0, 1, 2, and 3 for four edges and the index m may take the values of 0 and 1 for the two ends of the each edge.

Moreover, two values may be calculated for the respective edge (of length $((i_0 - i_1)^2 + (J_0 + j_1)^2)^{1/2}$). The first value is the edge pixel ratio ($epr_n$) which equals: (the number of $x(i).d \geq 0$ (connected edge pixels) entries within the edge)/L. The second value is a normalized edge-matching score ($es_n$) which equals: (the longest connected consecutive segment within the edge—the square root of the sum of distances corresponding to the longest consecutive segment—the longest broken segment)/L. Additionally, it is noted that the index n may take the values of 0, 1, 2, 3, for four edges of the respective quadrilateral.

After these metrics are computed, the respective quadrilateral is analyzed for its qualifications against additional criteria. First, a corner of the respective quadrilateral exists if both of its corner pixel ratio $cpr_{n,0}$ and $cpr_{n,1}$ are above a threshold (0.7 according to embodiments of the present invention). Secondly, an edge exists for the respective quadrilateral if its edge pixel ratio $ep_r$ is above a threshold (0.65 according to embodiments of the present invention).

A respective quadrilateral is selected for the candidate group if it has at least two corners and three edges deemed to exist by the preceding criteria. For each quadrilateral, a normalized corner-matching score and an edge-matching score are computed, for use in the Effective Area (EA) metric that was previously discussed, as follows:

$$cs = \left( \sum_{n=0}^{3} \sum_{m=0}^{1} cs_{n,m} \right) / 8$$

$$es = \left( \sum_{n=0}^{3} es_n \right) / 4$$

To implement step 310 of FIG. 3, embodiments of the present invention may utilize a minimum mean square error (MMSE) line-fitting procedure to maximize the accuracy and robustness of the selection of the four corners of the final quadrilateral. The preceding processing related to edge detection and line detection may identify a set of pixels by their pixel locations: $\{(i_n, j_n) | 0 \leq n \leq N\}$ associated with edge ($\rho_k$, $\theta_k$) The identified set of pixels may be associated with a line that satisfies the MMSE criterion according to the pseudo-code 1301 of FIG. 13 (where the line described by the form y=ax+b). For the final quadrilateral, four lines are determined (i.e., one for each edge of the quadrilateral) that satisfy the MMSE condition. From these four lines, the final corner locations are determined at the original resolution level.

As previously noted, after the corner locations are determined, the imaged document is processed by one of a number of suitable perspective correction algorithms that are known in the art. The selected perspective correction algorithm preferably processes the imaged document to cause the imaged document to be rectangular in shape and to occupy substantially all of the viewable area of the final image area. Suitable perspective correction algorithms may utilize a polygon mapping technique. Specifically, each pixel in the imaged document may be mapped to a polygon in the enhanced image, where the shape of the polygon is dependent upon the position of the pixel and the positions of the final corner locations.

When implemented via executable instructions, various elements of the present invention are in essence the code defining the operations of such various elements. The executable instructions or code may be obtained from a readable medium (e.g., hard drive media, optical media, EPROM, EEPROM, tape media, cartridge media, and/or the like) or communicated via a data signal from a communication medium (e.g., the Internet). Embodiments of the present invention may be implemented utilizing other programmable logic such as logic gate implementations, integrated circuit designs, and/or the like. In fact, readable media can include any medium that can store or transfer information.

FIG. 1400 depicts exemplary system 1400 that may be utilized to implement embodiments of the present invention. System 1400 may be implemented as any suitable processor-based system including, but not limited to, a personal computer, a personal digital assistant (PDA), a digital camera, and/or the like. System 1400 includes central processing unit (CPU) 1401 to execute software instructions. CPU 1401 may be any general purpose CPU and the present invention is not restricted by the architecture of CPU 1401 as long as CPU 1401 supports the inventive operations as described herein. CPU 1401 operates under the control of executable instructions such as a perspective correction algorithm including automatic document detection 1405 which is shown stored in non-volatile memory (e.g., PROM, EPROM, EEPROM, magnetic-media, optical media, and/or the like). CPU 1401 may operate under the control of the executable instructions to process image data structures 1403 which are stored in random access memory (RAM) 1402. After processing of image data according to embodiments of the present invention, perspective corrected images may be communicated to other systems utilizing input/output (I/O) adapter 1406 via the Internet, for example.

Figure 1A:
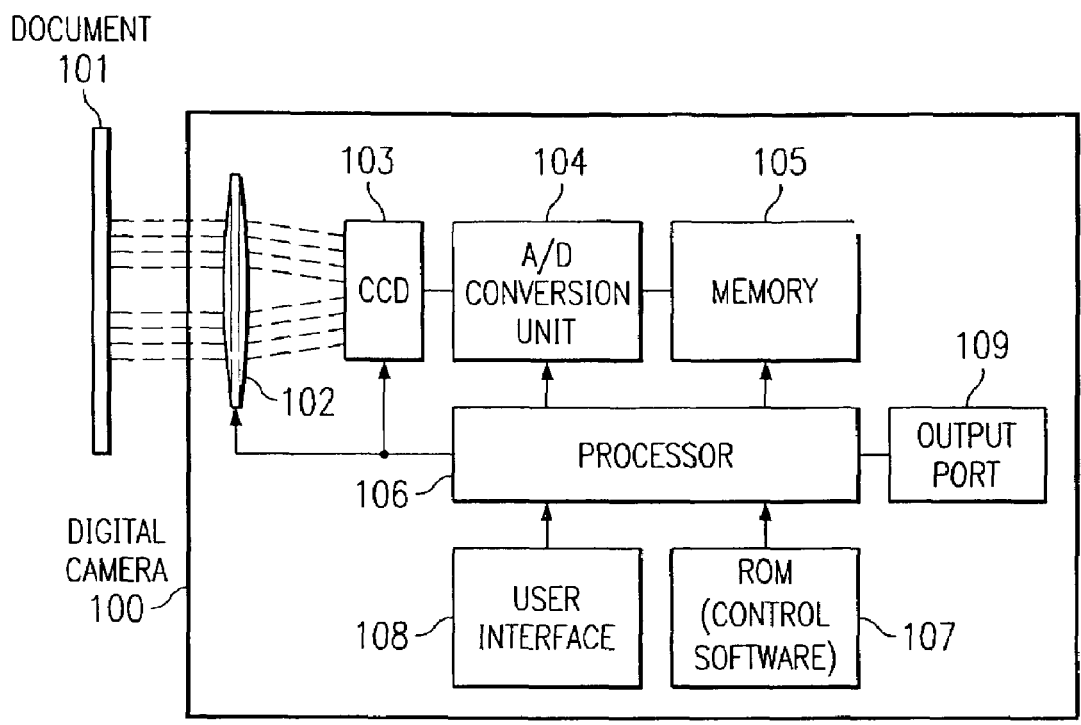
FIG. 1A depicts a digital camera accord to the prior art.
Figure 1B:
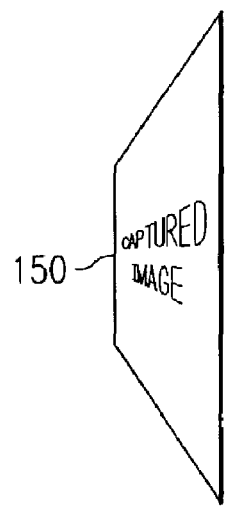
FIG. 1B depicts a perspective skewed imaged document according to the prior art.

By applying a suitable perspective correction algorithm and automatic document detection according to embodiments of the present invention, captured image 150 of FIG. 1B may be transformed into corrected image 200 of FIG. 2. Since the user is not required to manually control the correction algorithm, embodiments of the present invention provide several advantages. First, embodiments of the present invention may be employed in a digital camera without requiring the digital camera to possess a suitable user interface to permit manual manipulation of imaged documents. Secondly, although manual selection of corner locations via a personal computer may be acceptable for a very small number of documents, any appreciable number of documents causes the manually controlled correction algorithms to be quite cumbersome. In contrast, embodiments of the present invention enable a user to image a large number of documents with a digital camera for future review without imposing a substantial editing burden on the user. Moreover, embodiments of the present invention are quite robust to noise in the captured image and adapt to appreciable perspective distortion. By applying iteratively analyzing edge points, embodiments of the present invention are operable to detect the an optimal quadrilateral to perform the perspective enhancement with a relative degree of accuracy.

The invention claimed is:

1. A method for processing a digitally captured image that comprises an imaged document, said method comprising:
    detecting graphical information related to spatial discontinuities of said digitally captured image;
    detecting lines from said detected graphical information;
    computing effective area parameters for quadrilaterals associated with ones of said detected lines, wherein each effective area parameter for a respective quadrilateral equals an area of the respective quadrilateral modified by at least a corner matching score that is calculated from a sum of a number of connected edge pixels and a longest consecutive segment of detected lines in corners of said respective quadrilateral minus the square root of a sum of distances corresponding to the longest consecutive segment divided by a size of the corners; and
    selecting a quadrilateral of said quadrilaterals that possesses a largest effective area parameter.

2. The method of claim 1 wherein said computing comprises further modifying the area of each respective quadrilateral by an edge matching score that is indicative of a number of connected edge pixels of sides of said respective quadrilateral.

3. The method of claim 1 further comprising:
    performing perspective enhancement of said imaged document utilizing at least said selected quadrilateral.

4. The method of claim 3 wherein said performing perspective enhancement comprises:
    mapping a first area in said quadrilateral to a second area in a rectangle of a corrected image data structure, wherein said rectangle comprises graphical information that is substantially limited to said imaged document.

5. The method of claim 1 further comprising:
    enhancing graphical information related to spatial continuities of said digitally captured image.

6. The method of claim 1 further comprising:
    down-sampling said digitally captured image before performing said detecting.

7. The method of claim 6 further comprising:
    mapping down-sampled corners of said selected quadrilateral to pixels associated with said digitally captured image.

8. The method of claim 7 wherein said detecting lines comprises:
    determining corner locations of said imaged document utilizing pixels mapped from said down-sampled corners.

9. A system for processing a digitally captured image that comprises an imaged document, said system comprising:
    means for performing edge detection on said digitally captured image to produce an edge-enhanced image data structure;
    means for detecting lines from said edge-enhanced image data structure;
    means for computing effective area parameters for quadrilaterals associated with ones of said detected lines, wherein each effective area parameter for a respective quadrilateral equals on area of the respective quadrilateral modified by at least a corner matching score that is calculated from a sum of a number of connected edge pixels and a longest consecutive segment of detected lines in corners of said respective quadrilateral minus the square root of a sum of distances corresponding to the longest consecutive segment divided by a size of the corners; and
    means for selecting a quadrilateral associated with a largest effective area parameter.

10. The system of claim 9 wherein said means for computing further modifies the area of each respective quadrilateral by an edge matching score that is indicative of a number of connected edge pixels of sides of said respective qundrilateral.

11. The method claim 9 comprising:

means for performing perspective enhancement of said imaged document utilizing, at least, said selected quadrilateral.

12. The method of claim 11 wherein said means for performing perspective enhancement is operable to map a first area in said selected quadrilateral to an area of an enhanced image data structure.

13. The system of claim 9 wherein said means for performing edge detection is operable to low-pass filter said digitally captured image.

14. The system of claim 9 further comprising:
means for down-sampling said digitally captured image thut is operable before said means for performing edge detection is operable.

15. The system of claim 14 further comprising:
mapping down-sampled corners of said selected quadrilateral to pixels in said digitally captured image.

16. The system of claim 9 further comprising:
means for transforming said digitally captured image to luminance image before said means for performing edge detection is operable.

17. A computer-readable medium encoded with a data structure comprising executable instructions for processing a digitally captured image, said data structure comprising:
code for detecting graphical information associated with spatial discontimiities of said digitally captured image;
code for detecting lines from said detected graphical information;
code for computing effective area parameters for quadrilaterals associated with ones of said detected lines, wherein each effective area parameter for a respective quadrilateral equals an area of the respective quadrilateral modified by at least a corner matching score that is calculated from a sum of a number of connected edge pixels and a longest consecutive segment of detected lines in corners of said respective quadrilateral minus the square root of a sum of distances corresponding to the longest consecutive segment divided by a size of the corners; and
code for selecting a quadrilateral of said possible quadrilaterals that possesses a largest effective area parameter.

18. The computer-readable medium of claim 17 wherein said code for computing further modifies the area of each respective quadrilateral by an edge matching score that is indicative of a number of connected edge pixels of sides of said respective quadrilateral.

19. The computer-readable medium of claim 17 further comprising; code for performing perspective enhancement of said image document utilizing at least said selected quadrilateral.

20. The computer-readable medium of claim 17 further comprising:
code for removing respective edge pixels wherein each of said respective edge pixel is associated with a neighborhood that possesses at least one item from the list of: (1) a number of pixels that is less than a first threshold and (2) a number of pixels that are greater than a second threshold.

21. The method of claim 1, further comprising:
calculating the corner matching score, wherein the corner matching score for each corner equals the sum of the number of connected edge pixels and the longest consecutive segment of the detected lines within the corner minus the square root of a sum of distances corresponding to the longest consecutive segment divided by twice the size of the corners.

* * * * *

UNITED STATES PATENT AND TRADEMARK OFFICE
CERTIFICATE OF CORRECTION

PATENT NO. : 7,301,564 B2  
APPLICATION NO. : 10/197072  
DATED : November 27, 2007  
INVENTOR(S) : Jian Fan It is certified that error appears in the above-identified patent and that said Letters Patent is hereby corrected as shown below:

On the title page, item (56) under "Other Publications", in column 2, lines 4-6, below "142-154.*" delete "McLean, G.F.. "Geometric Correction of Digitized Art." Graphical Models and Image Processing, vol. 58, No. 2. (Mar. 1996) pp. 142-154." (entry repeated).

In column 3, line 52, delete "Y=int (0.299*R+0.587**G+0.114*B+0.5)" and insert -- Y=int (0.299*R+0.587*G+0.114*B+0.5) --, therefor.

In column 4, line 10, delete " $f_{i,j} = ke^{-\alpha^2][(i-c)^2+(j-c)^2]/c}$ " and insert -- $f_{i,j} = ke^{-\alpha^2[(i-c)^2+(j-c)^2]/c}$ --, therefor.

In column 6, line 51, delete "ρ=isin+jcosΘ" and insert -- ρ=isinΘ+jcosΘ --, therefor.

In column 7, line 34, delete "$H_{92,\Theta}$" and insert -- $H_{\rho,\Theta}$ --, therefor.

In column 8, line 13, delete "$H_{\rho,\eta}$" and insert -- $H_{\rho,\Theta}$ --, therefor.

In column 9, line 24, delete "Cs" and insert -- cs --, therefor.

In column 12, line 52, in Claim 9, delete "on" and insert -- an --, therefor.

In column 12, line 66, in Claim 10, delete "qundrilateral" and insert -- quadrilateral --, therefor.

In column 13, line 13, in Claim 14, delete "thut" and insert -- that --, therefor.

In column 13, line 26, in Claim 17, delete "discontimiities" and insert -- discontinuities --, therefor.

UNITED STATES PATENT AND TRADEMARK OFFICE
CERTIFICATE OF CORRECTION

PATENT NO. : 7,301,564 B2
APPLICATION NO. : 10/197072
DATED : November 27, 2007
INVENTOR(S) : Jian Fan It is certified that error appears in the above-identified patent and that said Letters Patent is hereby corrected as shown below:

In column 14, line 23, in Claim 20, after "threshold", insert -- ; --.

Signed and Sealed this

First Day of July, 2008

JON W. DUDAS
*Director of the United States Patent and Trademark Office*